United States Patent [19]

Tufts

[11] Patent Number: 4,658,008

[45] Date of Patent: Apr. 14, 1987

[54] HIGH IMPACT CROSS-LINKED POLYURETHANES

[75] Inventor: Timothy A. Tufts, Columbus, Ohio

[73] Assignee: Ashland Oil, Inc., Russell, Ky.

[21] Appl. No.: 767,990

[22] Filed: Aug. 21, 1985

[51] Int. Cl.$^4$ .............................................. C08G 18/32
[52] U.S. Cl. ...................................... 528/67; 528/75; 528/76; 528/77; 528/81; 528/83
[58] Field of Search ...................... 528/67, 75, 76, 77, 528/81, 83

[56] References Cited

U.S. PATENT DOCUMENTS

| | | | |
|---|---|---|---|
| 4,260,718 | 4/1981 | Harrissey et al. | 528/60 |
| 4,376,834 | 3/1983 | Goldwasser et al. | 528/66 |
| 4,385,133 | 5/1983 | Alberino et al. | 528/66 |

Primary Examiner—Maurice J. Welsh
Attorney, Agent, or Firm—H. M. Hanegan

[57] ABSTRACT

Polyurethane molding compositions characterized in providing tough, high temperature resistant cross-linked products during the in-mold curing cycle thereby obviating the need for post curing in order to obtain potentially optimum physical strength properties.

8 Claims, No Drawings

HIGH IMPACT CROSS-LINKED POLYURETHANES

BACKGROUND OF THE INVENTION

1. Field of the Invention

This invention relates to cross-linkable polyurethane molding compositions.

2. The Prior Art

Essentially linear polyurethane resins resulting from the step-growth reaction of a polyisocyanate and a diol have been employed extensively in the past for fabricating both cellular and non-cellular shaped articles. The underlying step-growth polymerization reaction is particularly adapted for fabricating such articles by the reaction injection molding (RIM) technique. The latter operation has now accordingly become the general molding procedure of choice in the relevant industry because of the substantial inherent economic advantages associated therewith. However, the linear polyurethane resins, in spite of being particularly adapted for RIM processing, have only rather limited end-use industrial applications due to the lack of structural strength properties. The ever expanding use of structural plastic members in the manufacture of automobiles and like assemblies has accordingly prompted efforts to upgrade the mechanical strength properties of the conventional polyurethane resins.

One way to achieve improved properties in this regard is to increase the cross-link density of the resultant polymeric structure. This can be realized in the most straightforward economical manner by employing as part of the conventional diol content a polyol having a hydroxyl functionality in excess of two. Representative recent patents following this tack for upgrading the mechanical strength properties of a typically composed polyurethane resin include U.S. Pat. Nos. 4,260,718; 4,376,834 and 4,385,133. This relevant prior art demonstrates the degree of improvement that can be realized in accordance with this approach. A notable disadvantage of this prior art is only tacitly indicated therein. It is to be accordingly noted that an extended post-cure cycle is required in order to attain the improvement in mechanical strength properties residing in the practice of this prior art. When this disadvantage is considered in context of RIM processing it can be seen how seriously the efficiency of such a molding operation is compromised. It is therefore the object of this invention to obviate the need for post-curing as called for in the practice of the aforementioned prior art.

SUMMARY OF THE INVENTION

In accordance with the present invention polyurethane molding compositions are provided which are particularly suited for RIM operations. The contemplated compositions are most singularly composed in respect of their overall polyol contents. An applicable polyol content consists essentially of a combination of propylene glycols and an oligomeric polyol of from about 3,000–10,000 average molecular weight. Of such combinations the propylene glycols constitute at least 50% by weight of the total polyol content. Of the indicated glycol component, specifically a combination of propylene glycol and dipropylene glycol, the latter; viz., the dipropylene glycol, is present in not in excess of 50% by weight of the total content of said propylene glycols. The polyisocyanate is present in an amount to provide an excess of equivalents of isocyanate for effecting the underlying urethane reaction and under conditions serving to trimerize the available excess.

DESCRIPTION OF THE PREFERRED EMBODIMENTS

As pointed out hereinabove the foremost object of this invention is to provide polyurethane molding compositions capable of developing into tough, high temperature resistant molded articles during the molding cycle. An important feature of the contemplated compositions contributing to the toughness of the resultant moldings, as measured by impact resistance, resides in the amount and make-up of the propylene glycol constituent of the total polyol content. As regards amount, the propylene glycol constituent ranges weight-wise from about equal to twice that of the oligomeric polyol constituent, the latter being discussed in detail more appropriately hereinbelow. As regards the make-up of the propylene glycol constituent same ranges, again weight-wise, from an equal amount of propylene glycol to that of dipropylene glycol to a combining ratio of about 6:1, respectively. It has been noted that a minor amount of a lower primary diol, ranging up to about 40% of the propylene glycol constituent, can be included without adversely affecting physical strength properties or the curing rate. The use of such diols may be resorted to for economy, increased compatability characteristics, or a like reason. Representative primary diols for this purpose include ethylene glycol, 1,3-propane diol, 1,4-butane diol, 1,6-hexane diol, and 1,4-cyclohexanedimethanol.

An oligomeric polyol having an average molecular weight between about 3,000 and 10,000 and having a hydroxyl functionality preferably in excess of 2 is employed in conjunction with the propylene glycols in the practice of this invention. A wide variety of these polyols are available for this purpose. These polyols are commercially marketed specialty products of a number of chemical manufacturers. In view of this, the best overview of these available commercial offerings can be accomplished by identifying the various general categories of the polymers and listing representative proprietary products falling within such categories. Also given in several instances are certain relevant specifications of the listed products supplied by the manufacturer.

Polymer/Polyether Polyols

Niax 31-28 (Union Carbide)—6000 MW triol/polyacrylonitrile dispersion.

Niax 34-28 (Union Carbide)—6000 MW triol/polyacrylonitrile-styrene dispersion.

Polyether Polyols

Thanol SF5505 (Texaco)—5000 MW poly(propylene oxide/ethylene oxide triol.

Voranol 2148 (Dow)—7200 MW poly(propylene oxide/ethylene oxide) triol.

Voranol 2103 (Dow)—3000 MW poly(propylene oxide/ethylene oxide) triol.

Pluracol TP4040 (BASF Wyandotte)—4000 MW poly(PO/EO) triol.

Terathane (Union Carbide)—polytetramethylene ether polyols.

Polyester Polyols

Formrez (Witco)—polyester polyols.

Tone (Union Carbide)—polycaprolactone polyols.

Polybutadiene Polyols

R45HT (Arco Polymers).

Polybutadiene—co—Acrylonitrile Polyols

Hycar HTBN (B. F. Goodrich).

Certain minor constraints largely imposed by RIM practices narrow the preferable choices of polyisocyanates for the general implementation of this invention. The aliphatic polyisocyanates are not particularly desirable because of the relatively low order of reactivity associated with the use thereof. The aromatic polyisocyanates on the other hand suffer for the reason of being relatively toxic in nature. The latter, particularly exemplified by toluene diisocyanate, can however be advantageously used but only under safeguard conditions. The most universally preferred polyisocyanate for molding operations of the type herein concerned is methylene-4,4'-diphenyldiisocyanate (MDI) as well as the various polymeric analogs thereof having an isocyanate functionality of from 2.1-2.7. An especially suitable polyisocyanate includes the various proprietary liquified MDI products. These products are chemically modified versions of MDI such that the melting point is lowered by the modification effected. Mixtures of the liquified MDI products and the polymeric isocyanates are particularly preferred in the practice of this invention.

The polyisocyanate is employed in an amount to provide an isocyanate index of from about 1.1-1.6; i.e., a 10-60% excess of NCO equivalence based on the total hydroxyl equivalents present in the molding composition. A catalyst for the urethane reaction is customarily utilized with the various tin salts and tertiary amines serving advantageously for this purpose. In order to achieve a higher degree of crosslinking in accordance with this invention attributable to the presence of excess isocyanate, a trimerization catalyst is indicated. A variety of bases are useful for this purpose. A particularly preferred catalyst of this type is N,N',N''-tris(dimethylaminopropyl) hexahydrotriazine which conveniently serves to catalyze effectively both the urethane reaction and the trimerization reaction.

The following working examples illustrate the manner in which the present invention can be implemented and further includes the best mode contemplated for carrying out same. All parts and percentages are by weight unless otherwise indicated.

EXAMPLE I

In this Example a series of neat moldings were prepared illustrating various embodiments of the invention. The compounding of the molding compositions and the subsequent casting of the moldings were the same in each instance. Dipropylene glycol, propylene glycol and the oligomeric polyol and catalyst were initially mixed in the desired proportions and degassed hot on a rotary evaporator. The mixture was cooled under vacuum and mixed by hand with the appropriate amount of isocyanate in an open container for about 15-20 seconds. The mixture was poured into a mold formed by two glass plates coated with a mold release and separated by a gasket and spacers to provide a ⅛" cavity. The mold in each instance was heated to 60°-90° C. before introducing the molding composition. After 5 minutes the mold was open and the solid plaque removed and divided into two parts. Part of the panel was tested as molded while the other diol was postcured for 1 hour at 130° C. The panels were tested for heat distortion temperature (HDT-ASTM D 648-56) and notched izod impact strength (ASTM D 256). Details concerning the compositional make-up of the various experimental molding experiments together with the indicated test data obtained for these samples are given in the following Table I:

TABLE I

| Exper. No. | Prop. Glyc. (g) | Diprop. Glyc. (g) | Polyol[1] Type (g) | Poly NCO[2] Type (g) | Cat.[3] (g) | HDT - °C. as molded | HDT - °C. post cured | NII - ft/lbs/inch as molded | NII - ft/lbs/inch post cured |
|---|---|---|---|---|---|---|---|---|---|
| 1. | (20) | (10) | A(20) | P-I(123) | (1) | 102 | 116 | 1.1 | 1.4 |
| 2. | (15) | (10) | A(14) | P-I(97) | (1) | 105 | 114 | 1.3 | 2.0 |
| 3. | (25) | (10) | A(24) | P-I(144) | (1) | 102 | 113 | 1.1 | 2.0 |
| 4. | (30) | (10) | A(26) | P-I(168) | (1) | 109 | 114 | 1.0 | 1.6 |
| 5. | (20) | (10) | A(20) | P-I(53) P-II(74) | (1) | 109 | 121 | 0.9 | 0.9 |
| 6. | (28) | (18) | B(30) | P-I(178) | (1) | 100 | 115 | 1.0 | 1.2 |
| 7. | (15) | (10) | C(14) | P-I(48.5) P-II(44.5) | (1) | 122 | 118 | 1.2 | 1.2 |
| 8. | (15) | (10) | B(14) | P-I(48.5) P-II(44.5) | (1) | 115 | 115 | 1.3 | 1.2 |
| 9. | (15) | (10) | A(93) | P-I(48.5) P-II(44.5) | (1) | 111 | 123 | 0.9 | 1.0 |
| 10. | (15) | (10) | A(18.7) | P-I(48.5) P-II(44.5) | (1) | 104 | 124 | 1.3 | 1.3 |
| 11. | (15) | (10) | D(14) | P-I(48.5) P-II(44.5) | (1) | 104 | — | 1.6 | 1.3 |
| 12. | (20) + 10 g EG | (10) | A(30) | P-I(176) | | 100 | 116 | 1.1 | 1.8 |
| 13.[4] | (15) | (10) | A(14) | P-I(44) P-II(48) | | 105 | 128 | 1.1 | 1.4 |
| 14. | (15) | (10) | E(14) | P-I(44) P-II(48) | | 106 | 120 | 1.5 | 1.4 |
| 15. | (15) | (10) | F(14) | P-I(44) | | 109 | 127 | 1.1 | 1.1 |

TABLE I-continued

| Exper. No. | Prop. Glyc. (g) | Diprop. Glyc. (g) | Polyol[1] Type (g) | Poly NCO[2] Type (g) | Cat.[3] (g) | HDT - °C. | | NII - ft/lbs/inch | |
|---|---|---|---|---|---|---|---|---|---|
| | | | | | | as molded | post cured | as molded | post cured |
| | | | | P-II(48) | | | | | |

[1]Polyol Type
A — Niax 31-28 (Union Carbide)
B — Niax 34-28 (Union Carbide)
C — Thanol SF5505 (Texaco)
D — Voranol 2148 (Dow)
E — Voranol 2103 (Dow)
F — Pluracol TP4040 (BASF Wyandotte)
[2]Polyisocyanate Type
P-I Isonate 143-L (Upjohn)
P-II Mondur MR (Mobay)
[3]Catalyst
PC 41 (Abbott Laboratories) N,N'N''—tria(dimethylaminopropyl)hexane hydrotriazine
[4]2 minute demold

EXAMPLE II

The composition of experiment No. 6 set forth in Table I of Example I was processed in an Accuratio VR-75 RIM machine. One feed to the machine consisted of the diols, polyol and catalyst while the other feed consisted of the polyisocyanate. A mold temperature of 90° C. was observed. Three random roving glass mats were placed into the mold cavity (M-8610 Owens Corning). The plaque was removed after 4 minutes and divided into two parts. One part was tested as molded whereas the other part was post-cured for 1 hour at 130° C. Various physical properties were determined for the respective test samples and the results obtained are set forth as follows:

| | AS MOLDED | POST CURED |
|---|---|---|
| Flex strength (at yield) | 30,900 psi | 31,000 psi |
| Flex Modulus | 955,000 psi | 845,000 psi |
| Tensile Modulus | $1.05 \times 10^6$ psi | 946,000 psi |
| Tensile Strength | 20,200 psi | 18,500 psi |
| HDT | 133° C. | 139° C. |
| NII | 11.6 ft-lbs/in. | 9.5 ft-lbs/in |
| Unnotched Izod impact | 18.0 | 16.3 |

What is claimed is:

1. A polyurethane molding composition having a polyisocyanate component, a polyol component consisting essentially of (a) 0.5–0.85 part by weight propylene glycol and correspondingly from 0.5–0.15 part dipropylene glycol, and (b) an oligomeric polyol of from about 3,000–10,000 average molecular weight wherein the weight relationship of (a) and (b) is from about 2:1:1:1, respectively, and in which the polyisocyanate component provides an overall isocyanate equivalent index of from about 1.1–1.6.

2. The polyurethane molding composition according to claim 1 wherein the polyisocyanate component is selected from the group consisting of methylene-4,4'-diphenyl diisocyanate, liquified methylene-4,4'-diphenyl diisocyanate, a polymeric analog of methylene-4,4'-diphenyl diisocyanate and mixtures thereof.

3. The polyurethane molding composition according to claim 2 wherein the oligomeric polyol is a hydroxy terminated polybutadiene or butadiene/acrylonitrile copolymer.

4. The polyurethane molding composition according to claim 2 wherein the oligomeric polyol is a polyester polyol.

5. The polyurethane molding composition according to claim 4 wherein the polyester polyol is a polyester diol.

6. The polyurethane molding composition according to claim 2 wherein the oligomeric polyol is a polyoxyalkylene polyol or a polymer/polyoxyalkylene polyol dispersion.

7. The polyurethane molding composition according to claim 6 wherein the polymer of said polymer/polyol dispersion is an acrylonitrile homopolymer.

8. The polyurethane molding composition according to claim 6 wherein the polymer of said polymer/polyol dispersion is an acrylonitrile-styrene copolymer.

* * * * *